United States Patent
Baca (10) Patent No.: US 10,445,169 B2
(45) Date of Patent: Oct. 15, 2019

(54) TEMPORAL RELATIONSHIP EXTENSION OF STATE MACHINE OBSERVER

(71) Applicant: Freescale Semiconductor, Inc., Austin, TX (US)

(72) Inventor: David Baca, Roznov pod Radhostem (CZ)

(73) Assignee: NXP USA, Inc., Austin, TX (US)

( * ) Notice: Subject to any disclaimer, the term of this patent is extended or adjusted under 35 U.S.C. 154(b) by 93 days.

(21) Appl. No.: 15/094,024

(22) Filed: Apr. 8, 2016

(65) Prior Publication Data

US 2017/0293516 A1    Oct. 12, 2017

(51) Int. Cl.
| | | |
|---|---|---|
| G06F 11/00 | (2006.01) | |
| G06F 11/07 | (2006.01) | |
| G06F 11/30 | (2006.01) | |

(52) U.S. Cl.
CPC ........ *G06F 11/079* (2013.01); *G06F 11/0706* (2013.01); *G06F 11/0724* (2013.01); *G06F 11/0751* (2013.01); *G06F 11/0793* (2013.01); *G06F 11/3006* (2013.01); *G06F 11/3017* (2013.01)

(58) Field of Classification Search
CPC ............. G06F 11/0724; G06F 11/0751; G06F 11/0757; G06F 11/079
See application file for complete search history.

(56) References Cited

U.S. PATENT DOCUMENTS

| | | | | |
|---|---|---|---|---|
| 5,506,963 A | * | 4/1996 | Ducateau | G06F 9/4887 710/58 |
| 5,706,425 A | * | 1/1998 | Unekawa | H04Q 11/0478 714/55 |

(Continued)

FOREIGN PATENT DOCUMENTS

| | | |
|---|---|---|
| EP | 2343650 A2 | 7/2011 |
| EP | 2343650 A3 | 7/2011 |

OTHER PUBLICATIONS

Bresolin, Davide et al., "Deterministic Timed Finite State Machines: Equivalence Checking and Expressive Power," Proceedings of the Fifth International Symposium on Games, Automata, Logics and Formal Verification (GandALF 2014) EPTCS 161, 2014, pp. 203-216.

(Continued)

*Primary Examiner* — Elmira Mehrmanesh (57) ABSTRACT

A method includes receiving a first progress request from a first state machine associated with execution of a first thread on a processor. The method includes updating a current state of a temporal relationship state machine based on the current state, the first progress request, and a predetermined temporal relationship between progress of the first state machine to a first state machine state and progress to a second state. The predetermined temporal relationship may require the first state machine to progress to the first state machine state before the progress to the second state. The current state of the temporal relationship state machine may be one of a first temporal relationship state and a second temporal relationship state. The second state may be a second state machine state of the first state machine. The second state may be a second state machine state of a second state machine.

18 Claims, 5 Drawing Sheets

(56) References Cited

U.S. PATENT DOCUMENTS

| | | | | |
|---|---|---|---|---|
| 7,178,062 B1* | 2/2007 | Dice | ............... | G06F 9/524 |
| | | | | 710/260 |
| 7,464,301 B1* | 12/2008 | Entezari | ............... | G06F 11/3476 |
| | | | | 714/45 |
| 7,831,862 B2* | 11/2010 | Moyer | ............... | G06F 11/3656 |
| | | | | 714/30 |
| 7,958,396 B2 | 6/2011 | Chitsaz et al. | | |
| 7,971,104 B2* | 6/2011 | Dolev | ............... | G06F 11/0721 |
| | | | | 712/226 |
| 8,005,736 B2* | 8/2011 | Botzer | ............... | G06Q 10/10 |
| | | | | 705/35 |
| 8,543,860 B2* | 9/2013 | Beattie | ............... | G06F 1/04 |
| | | | | 327/291 |
| 8,904,073 B2* | 12/2014 | Kaushikkar | ............... | G06F 9/4411 |
| | | | | 710/100 |
| 8,930,965 B1* | 1/2015 | Shalev | ............... | G06F 9/4881 |
| | | | | 719/318 |
| 9,245,147 B1* | 1/2016 | Williams | ............... | G06F 21/6218 |
| 2004/0015741 A1* | 1/2004 | Ben-Moyal | ............... | G06F 11/0757 |
| | | | | 714/38.13 |
| 2005/0188274 A1 | 8/2005 | Vedam et al. | | |
| 2007/0094192 A1* | 4/2007 | Aurora | ............... | G06F 8/31 |
| | | | | 706/46 |
| 2010/0235558 A1* | 9/2010 | Snead | ............... | G06F 11/0724 |
| | | | | 710/267 |
| 2010/0332909 A1* | 12/2010 | Larson | ............... | G06F 11/3476 |
| | | | | 714/40 |
| 2011/0099146 A1 | 4/2011 | McAlister et al. | | |
| 2011/0173354 A1* | 7/2011 | Hall | ............... | G05B 19/045 |
| | | | | 710/58 |
| 2013/0007532 A1* | 1/2013 | Miller | ............... | G06F 11/349 |
| | | | | 714/45 |
| 2013/0024472 A1* | 1/2013 | Stein | ............... | G06Q 10/06 |
| | | | | 707/769 |
| 2014/0082434 A1* | 3/2014 | Knight | ............... | G05B 19/0428 |
| | | | | 714/55 |
| 2015/0293807 A1* | 10/2015 | Ralston | ............... | G06F 11/0757 |
| | | | | 714/37 |
| 2016/0098313 A1* | 4/2016 | Moyer | ............... | G06F 11/0757 |
| | | | | 714/55 |

OTHER PUBLICATIONS

Budiyanto, Ida et al., "Formal Verification of Integrated Modular Avionics (IMA) Health Monitoring Using Timed Automata," IEEE International Seminar on Intelligent Technology and Its Applications, 2015, pp. 291-295.

Campana, Salvatore and Spalazzi, Luca, "Dynamic Networks of Timed Automata for Collaborative Systems: a Network Monitoring Case Study," IEEE International Symposium on Collaborative Technologies and Systems (CTS), 2010, pp. 113-122.

Lu, David Jun, "Watchdog Processors and Structural Integrity Checking," IEEE Transactions on Computers, vol. C-31, No. 7, Jul. 1982, pp. 681-685.

Wikipedia, "Linear Temporal Logic", downloaded from https://en.wikipedia.org/wiki/Linear_temporal_logic, Sep. 2, 2015, pp. 1-4.

Oikonomou, Kostas N: "Abstractions of Finite-State Machines and Optimality with Respect to Immediately-Detectable Next-State Faults", IEEE Transactions on Systems, Man and Cybernetics. Part A:Systems and Humans, IEEE Service Center, Piscataway, NJ, US, vol. 26, No. 1, Jan. 1, 1996 (Jan. 1, 1996).

* cited by examiner

TEMPORAL RELATIONSHIP EXTENSION OF STATE MACHINE OBSERVER

BACKGROUND

Field of the Invention

This invention relates to processing systems and, more particularly, to operation flow monitoring in processing systems.

Description of the Related Art

In general, safety applications use operation flow monitoring to detect loss of integrity due to hardware or software faults. Operation flow monitoring may detect bugs in hardware or software in addition to design flaws that cause race conditions or unintended events. If implemented effectively and efficiently, operation flow monitoring, in conjunction with other, higher level, measures, may replace hardware lock-step techniques used to ensure timely detection of hardware faults and to reduce or eliminate unsafe consequences. Operation flow monitoring may use watchdog processing to detect incorrect operation flow. Typical watchdog processing techniques use at most one watchdog per processor core, which may be insufficient to monitor all tasks that need to be monitored. Individual differences in time constraints between different check points may be difficult to observe. In addition, conventional techniques use in-line code monitoring that requires substantial overhead and has difficulties dealing with non-determinism. Furthermore, in-line code monitoring may not yield a substantial improvement with respect to hardware fault detection. Accordingly, improved techniques for monitoring operation flows in a processing system are desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

A state machine observer implements one or more parallel state machines corresponding to one or more threads executing on a multi-core or multitasking system. The state machines may be equipped with the notion of time, i.e., may be timed state machines or timed automata. The state machine observer detects whether the execution violates logical, control flow, or timing constraints. As referred to herein, an automaton or a state machine is a sequential logic system that generates outputs which depend on previous and present inputs. An automaton or state machine may be embodied as a processor executing instructions retrieved from memory or embodied as another sequential circuit or sequential digital system. The state machine observer includes a temporal relationship state machine to monitor the one or more parallel state machines for execution conformance to a predetermined temporal relationship between states in response to progress requests from one or more parallel state machines. Each of the one or more parallel state machines may be defined based on an operation flow model of an algorithm or protocol implemented by at least a portion of an application thread, or other task executing on the processing system, that may be based on source code structure or object code structure of software. The associated operation flow model may be a higher level model that excludes structures used by the object code or source code so that a state machine observer may observe progress of the operation flow.

Figure 1:
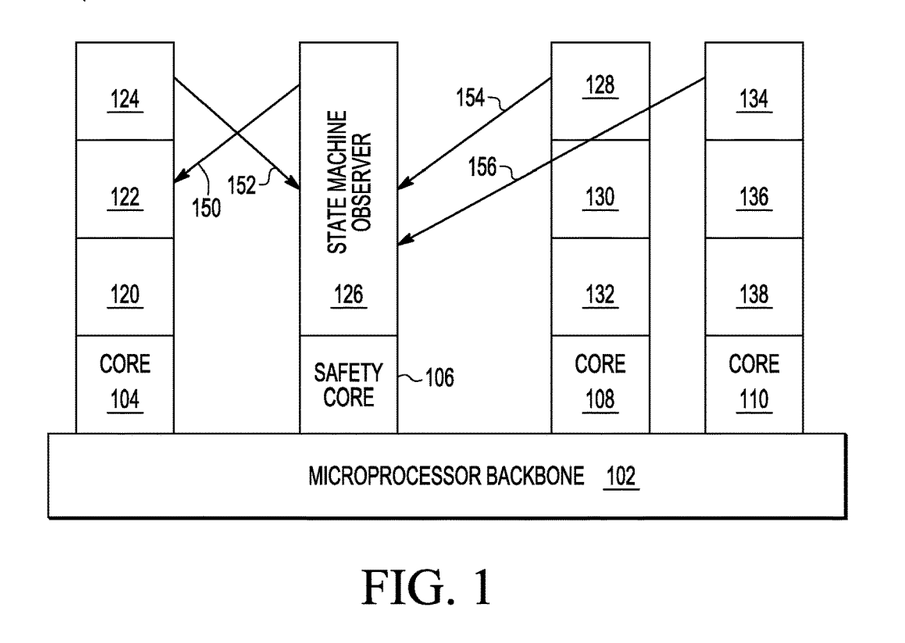
FIG. 1 illustrates a functional block diagram of an exemplary multi-core processing system including a state machine observer implemented using a safety core configured consistent with at least one embodiment of the invention.
Figure 2:
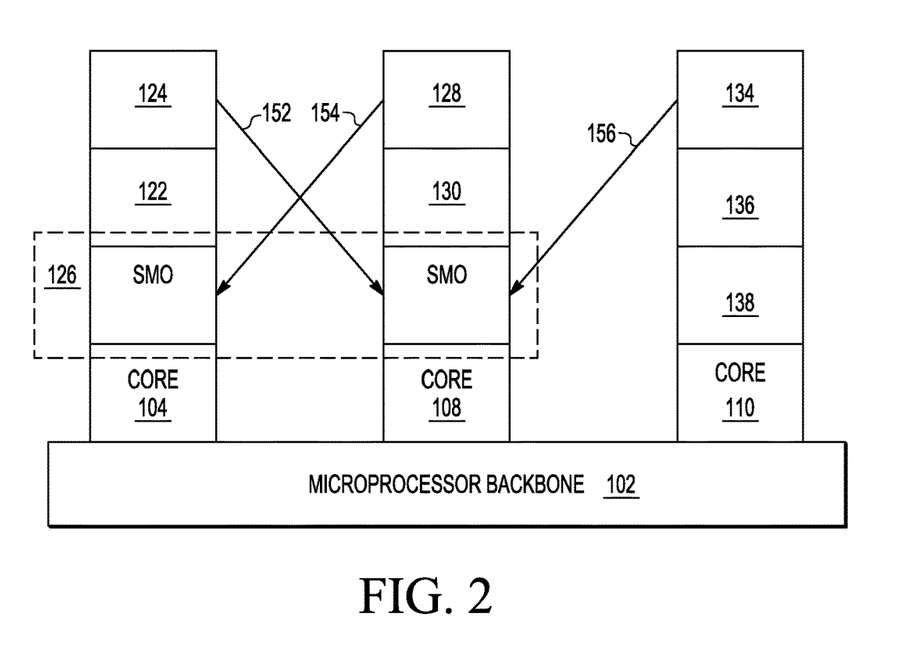
FIG. 2 illustrates a functional block diagram of an exemplary multi-core processing system including a state machine observer distributed across multiple cores consistent with at least one embodiment of the invention.
Figure 3:
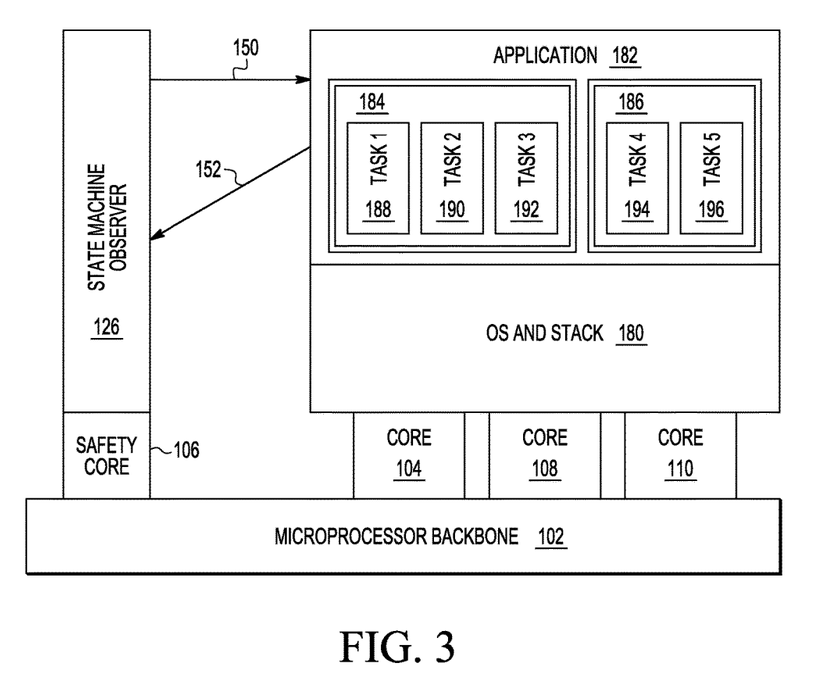
FIG. 3 illustrates a functional block diagram of an exemplary multi-core processing system including a state machine observer implemented using a safety core configured monitoring progress of an application executing using an operating system executing on other cores of the multi-core processing system consistent with at least one embodiment of the invention.

Referring to FIGS. 1-3, processing system 100 includes multiple processing cores coupled to a microprocessor backbone 102, which may include at least a portion of a main memory system, one or more communications interfaces, or other suitable processing system circuits. State machine observer 126 may execute on safety core 106, which may be a small co-processor, or on one or more of cores 104, 108, and 110. State machine observer 126 may be independent of the main processor to reduce dependent faults or common cause faults. State machine observer 126 may be configured to monitor execution of one or more threads 120, 122, 124, and 128-138, of FIGS. 1 and 2 executing on one or more cores based on progress of an operation flow model and to provide status indicator 150 to one or more of those threads. Similarly, state machine observer 126 may be configured to monitor execution of one or more of tasks 188, 190, . . . , 196 of threads 184 and 186 of application 182 executing on cores 104, 108, and 110 using operation system and stack 180 of FIG. 3. State machine observer 126 may include a series of parallel state machine observers augmented with real-time application constraints executing on a safety core or distributed across multiple cores or processors. State machine observer 126 may monitor multiple different executions or tasks at the same time, e.g., tasks executing in parallel on different cores or different processors of a multi-core system or multi-processor system, respectively.

State machine observer 126 may provide status indicator 150 indicating a current status of state machine observer 126 to one or more threads executing on a core of system 100. State machine observer 126 may have the following status modes of operation: running—OK, running—automaton error, and stopped—failure. The running—OK status mode indicates that state machine observer 126 operates as expected and detected no error states from any state machine. If any state machine detects a fault, this is signaled by the state machine observer 126 having a status of running—automaton error. State machine observer 126 may query the state machines further to identify which state machine has failed. If state machine observer 126 detects that it has failed to perform its functionality correctly, it is stopped and has a status of stopped—failure. However, note that state machine observer 126 states are exemplary only and a status indicator of other suitable states and operation may be used.

A formal automaton or state machine may monitor operation flow execution of high-level programming structures (e.g., not assembly language constructs). As processing system 100 executes one or more applications, state machine observer 126 collects information related to the execution by the one or more cores. The information may be collected using any suitable technique (e.g., bus monitoring or receiving information 152, 154, and 156 deliberately communicated to state machine observer 126). The state machine observer and state machines may execute in virtual time to determine that operation flow transitions occur correctly. In addition to detecting whether operation flow transitions occur according to a predetermined sequence, in some embodiments, state machine observer 126 also detects timing faults, e.g., no transition faults and delayed transition faults.

Referring to FIG. 2, state machine observer 126 may be distributed across multiple cores or processors. State machine observer 126 may include multiple automata (e.g., multiple state machines), each automaton monitoring a single operation flow execution. State machine observer 126 loads the definitions of state machines during system initialization operations and may be implementation dependent. Each state machine may have a finite set of states S, an initial state s0, a set of defined transitions E, and in embodiments where the state machines are timed state machines, a corresponding clock c, and associated timing transition constraint q, where c≤q for proper operation, some or all of which may be stored in a corresponding data structure stored in a corresponding data structure in memory or other storage element. Note that in embodiments where the state machines are untimed, clock c and timing constraint q are not included. In addition, a description of the nodes of the state machine and relationships between those nodes may be stored in memory. If a state machine is a timed state machine, the clock variable c is a non-negative integer measuring time progress in ticks generated by state machine observer 126. The variable state holds the active or current state of the state machine and the variable TReq stores a state identifier for a next state to which the progress is requested. For any state machine of state machine observer 126, there exists only one oriented transition between any two states. In embodiments where a state machine is a timed state machine, a state invariant of a state machine state I(s) constrains the clock limit for state s, i.e., constrains how long the state machine may stay in the state. For example, state invariant of a state machine state I(s) is greater than timing constraint q for all outgoing transitions.

State machine observer 126 monitors operation flow execution by progressing each state machine along states that the operation flow execution visits. For example, the state machine is a state machine of the execution operation flow or protocol that the execution should follow. In at least one embodiment, the state machine is a timed state machine and state machine observer 126 periodically increments the clock of the state machine. The monitored execution reports its execution progress timely, otherwise the timed state machine may detect a false time constraint violation. The timed state machine reports an error if the monitored execution does not follow a predetermined operation flow or if the monitored execution violates a time constraint. Each timed state machine starts monitoring functionality from the corresponding initial state and a zeroed clock.

A reset of a state machine sets the variable state to initial state s0 and clears variable TReq. If the state machine is a timed state machine, the reset also clears clock c. A state machine progresses from a current state to a next state, i.e., transitions states, when guarding conditions are true, e.g., variable TReq=$s_x$. If the state machine is a timed state machine, one or more additional guarding conditions may be required, e.g., clock c>0 and clock c≤q. When a state machine progresses, variable TReq is cleared. If the state machine is a timed state machine, the timed state machine clock c is also cleared when the state machine progresses. If no transition is requested, the state machine does not progress. Illegal or untimely events may occur that cause the state machine to enter an error state, i.e., a detected fault state. For example, a state machine enters an error state if the current state invariant is violated or an illegal transition is requested. An invariant violation may occur when progress of the state machine is requested and there is no transition defined from the current state stored in variable state to the requested state in variable TReq. If the state machine is a timed state machine, the state machine may also enter an error state if a late transition is requested (q<c), or an early transition is requested (c==0). Accordingly, state machine observer 126 sets the current state stored in variable state to illegal transition.

In at least one embodiment, if the state machine is a timed state machine, state machine observer 126 may detect the illegal transition indirectly. That is, the illegal transition is not directly detected and the illegal progress request blocks any subsequent legal progress requests or no new progress request would occur. The state machine enters time violation state due to a state invariant violation. State machine observer 126 detects a late transition in response to a legal progress request that fails to meet a clock constraint. Since the transition cannot be enabled, the state machine stays in its current state until the state machine violates the state invariant. State machine observer 126 detects the late transition and sets the state machine to time violation state. State machine observer 126 detects an early transition in response to a legal progress request being followed too soon by another transition request, e.g., the first transition clears clock c and the very next transition request is considered while clock c==0. The next transition request is not processed and the state machine observer 126 sets the state machine state to illegal transition state. Error states (e.g., time violation state or illegal transition state) have no outgoing transitions. To leave an error state, state machine observer 126 may reset the state machine. As a result, state invariants may be ignored or they may be used to initiate a device reset if state machine observer 126 does not move the state machine to a suspend mode within the invariant time.

A state machine may be in run mode and progresses as described above, or may be in suspend mode, in which the state machine does not progress and if the state machine is a timed state machine, has a stopped clock. When state machine observer 126 performs a reset operation, the state machine may enter run mode from suspend mode (e.g. if the state machine is configured to start in run mode). When the state machine is in run mode and not in an error state, the state machine signals that it has a status of OK. When the state machine is a timed state machine in run mode and detects a time violation error, the state machine signals that it has a status of time violation error. When the state machine is in run mode and detects an illegal transition, the state machine signals that it has a status of illegal transition error. When the state machine is in suspend mode, the state machine signals that it has a status of suspended.

Figure 4:
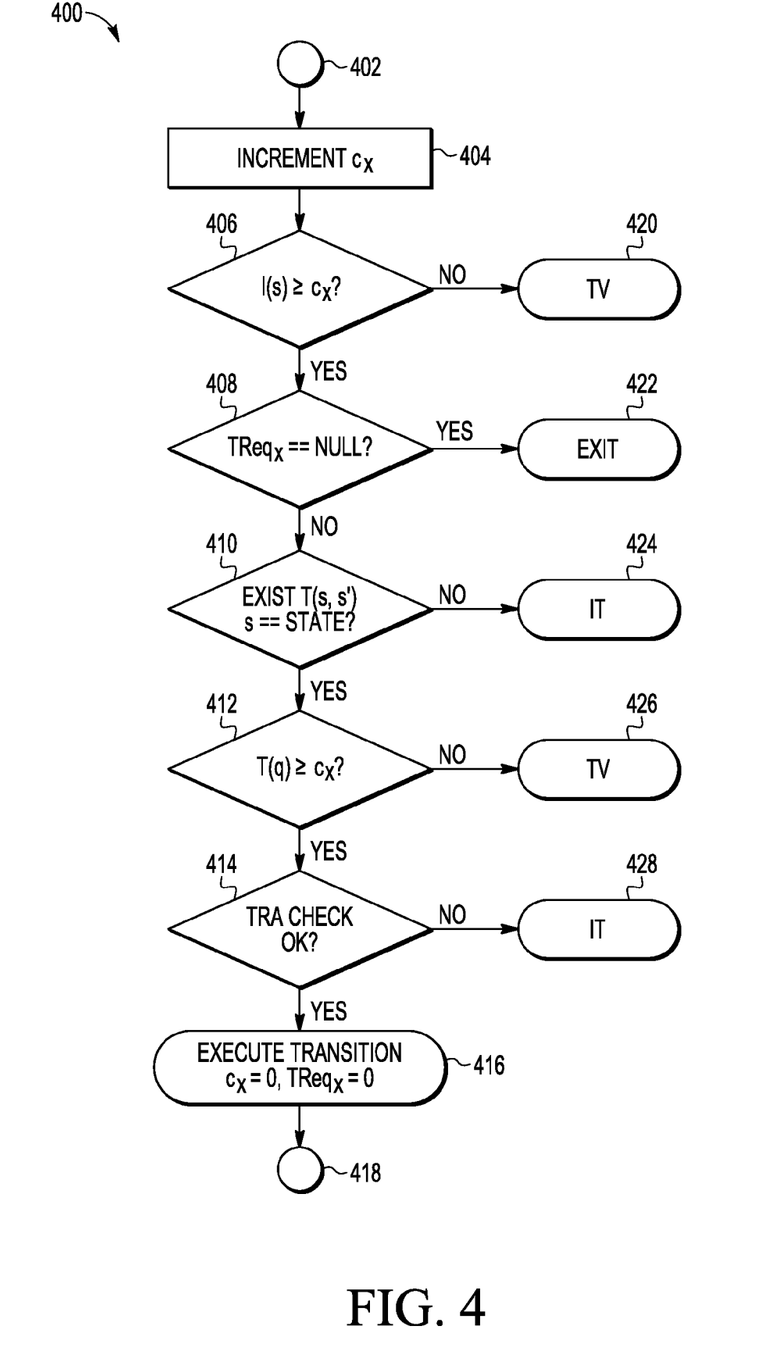
FIG. 4 illustrates an information and control flow for an exemplary state machine observer of FIGS. 1-3 consistent with at least one embodiment of the invention.

Referring to FIG. 4, in an exemplary embodiment, state machine observer 126 is a timed watchdog processor that performs operation sequence 400 for each timed state machine $TA_x$ where x=1 . . . n, n being an integer greater than or equal to one. State machine observer 126 may exchange active and non-active buffers stored in memory as an atomic action and processes records in the non-active buffer. The processing results in writes to the timed state machine variable TReq registers. Two or more writes to the same variable TReq register results in illegal transition state for the respective timed state machine $TA_x$.

State machine observer 126 may include multiple timed state machines that concurrently monitor execution progress. Each timed state machine monitors a task or a series of events that should occur in a particular order. Between time ticks of state machine observer 126, a particular timed state machine collects corresponding requests for progress to be performed at a respective time tick. During time period $\Delta\tau$ the timed state machines collect requests for progress, but only one request per timed state machine is allowed. If a timed state machine detects two requests for progress of that timed state machine, the timed state machine transitions to illegal transition error state. In response to a time tick of state machine observer 126, all timed state machine clocks increment and the timed state machines process all requests for progress. Thus, the collected transition requests are interpreted as arrived at the time tick. If no dependencies exist between timed state machines in the order in which the timed state machines are updated and whether each timed state machine is updated at once or in sub-steps is irrelevant.

In at least one embodiment, during a time period $\Delta\tau$, the timed state machine collect requests for progress. Only requests from the very last time period may be processed. If a timed state machine receives a request during processing of prior requests, two independent, but substantially identical buffers, buffer Buf0 and buffer Buf1, may be used. Each of those buffers may be a first-in-first out buffer. The buffers may receive transition requests including an identifier of a corresponding timed state machine $TA_x$ and an identifier of the state to which the timed state machine is being requested to transition, stored in variable $TReq_x$. If the buffers receive two or more writes for a particular timed state machine during the time tick, the timed state machine transitions to the illegal transition state. The buffers collect those transition requests, only one buffer being active at a time (i.e., per time period $\Delta\tau$). In response to occurrence of a time tick, the non-active buffer becomes the active buffer and state machine observer 126 processes the request from the non-active buffer. The use of two buffers reduces or eliminates occurrence of race conditions between incoming requests and processing of the requests.

State machine observer 126 independently monitors each task, executable, or execution protocol carried out by the system. The reported progress shall be correct and on time; otherwise, state machine observer 126 signals an error. Referring to FIG. 4, in exemplary operation flow 400, state machine observer 126 processes a timed state machine and temporal relationship state machine at each tick $\tau_i$, for each of x timed state machines $TA_x$ (402). State machine observer 126 increments clock $c_x$ corresponding to timed state machine $TA_x$ (404). If state invariant I(s) of $state_x$ of $TA_x$ is less than clock $c_x$ (406), then state machine observer 126 sets $state_x$ of timed state machine $TA_x$ to the time violation state and may provide a status indicator indicative thereof to one or more threads associated with operation flow 400 (420). If state invariant I(s) of $state_x$ of timed state machine $TA_x$ is greater than or equal to clock $c_x$ (406), then state machine observer 126 checks for outstanding progress requests in register $TReq_x$ corresponding to timed state machine $TA_x$ (408). If no progress requests are pending, then state machine observer 126 exits until next tick $\tau_i$ (422). If a progress request is pending in register $TReq_x$ corresponding to timed state machine $TA_x$, state machine observer 126 identifies a transition from state s stored in $state_x$ to a next state s' in register $TReq_x$ with timing constraint q (410). If no such transition is defined in the predetermined set of transitions for timed state machine $TA_x$ stored in memory, then state machine observer 126 sets $state_x$ of timed state machine $TA_x$ to the illegal transition state and may provide a status indicator indicative thereof to one or more threads associated with operation flow 400 (424). State machine observer 126 verifies satisfaction of timing constraint q. If timing constraint q is less than clock $c_x$, then state machine observer 126 sets $state_x$ of timed state machine $TA_x$ to the time violation state and may provide a status indicator indicative thereof to one or more threads associated with operation flow 400 (426). If timing constraint q is greater than or equal to clock $c_x$, then state machine observer 126 checks any temporal relationship state machine state associated with timed state machine $TA_x$, as described further below (414). If state s' in register $TReq_x$ is associated with a temporal relationship state machine state, state machine observer 126 initiates an associated temporal relationship state machine progress request. If the associated temporal relationship state machine progress request returns the illegal transition state, then state machine observer 126 sets state), of timed state machine $TA_x$ to the illegal transition state and may provide a status indicator indicative thereof to one or more threads associated with operation flow 400 (428). Otherwise, temporal relationship state machine requires state machine observer 126 to execute the temporal relationship state machine progress, transition of $state_x$ of timed state machine $TA_x$ to state s', clearing clock $c_x$ and register $TReq_x$ (416), and exiting until next tick $\tau_i$ (418).

State machine observer 126 completes temporal relationship state machine p-requests stored in the p-request buffer and checks for a new tick $\tau_i$. For example, if a new tick flag is set at the end of operation flow 400, then state machine observer 126 has taken too long to return to state 402 and state machine observer 126 reports timing failure. In other embodiments, state machine observer 126 verifies that progress of each task, executable, or execution protocol carried out by the system is correct and has appropriate temporal relationships, but does not verify that tasks are carried out on time because the state machines are untimed. In such embodiments, referring back to FIG. 4, state machine observer 126 processes untimed state machines for each of x state machine $UA_x$ without clock and timing constraints instead of the timed state machine $TA_x$ (402). State machine observer 126 checks for outstanding progress requests in register $TReq_x$ corresponding to untimed state machine $UA_x$ (408), identifies any transitions from state s stored in $state_x$ to a next state s' in register $TReq_x$ (410), checks any temporal relationship state machine state associated with untimed state machine $UA_x$, as described further below (414), and executes the temporal relationship state machine progress and transitions of $state_x$ of untimed state machine $UA_x$ to state s', clearing register $TReq_x$ (416). However, in these embodiments, state machine observer 126 does not include any associating timing operations (e.g., 404, 406, 412) and timing violation states (420 and 426) in the associated operation flow. Operation flow 400 for timed state machines, as illustrated, and its adaptation for untimed state machines, as described above, are exemplary only and other operation flows including checks for a temporal relationship state machine state associated with a timed or untimed state machine may be used consistent with the description herein.

Figure 5:
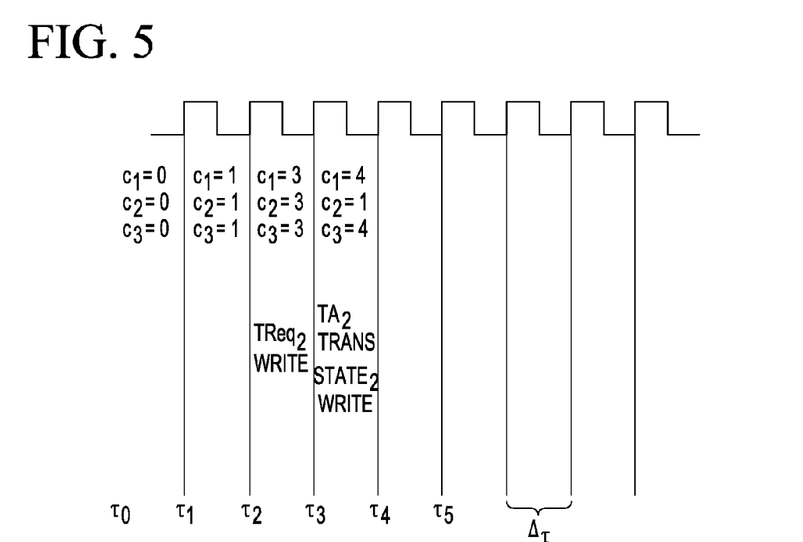
FIG. 5 illustrates a timing diagram associated with an exemplary state machine observer of FIGS. 1-3 consistent with at least one embodiment of the invention.

Referring to FIG. 5, timed state machine $TA_1$, timed state machine $TA_2$, and timed state machine $TA_3$ progress synchronously at a time tick of state machine observer 126 using clocks $c_1$, $c_2$, and $c_3$, respectively. Time ticks occur periodically with the period of $\Delta\tau$. A sequence of time ticks is denoted $\tau_0, \tau_1, \tau_2, \ldots, \tau_n$. The time period between the ticks is the same (e.g., a time period $\Delta\tau$). After tick $\tau_2$, but before tick $\tau_3$, timed state machine $TA_2$ receives a request for transition, e.g., written to register $TReq_2$. When tick $\tau_3$ occurs, state machine observer 126 increments the clocks and clock $c_2=3$. State machine observer 126 evaluates the clock condition and the transition request in register $TReq_2$. Assuming the clock condition is met and the transition request is valid, timed state machine $TA_2$ transitions and $state_2$ updates to state s', accordingly. The executed transition sets $c_2=0$ and $TReq_2=0$. As a result, when tick $\tau_4$ occurs, after the clocks increment, clock $c_2==1$.

In general, a state machine visits a state if the state machine has just transitioned to that state. A typical relationship between states of state machines of state machine observer 126 is sequential. In a sequential relationship, if two states are connected by a transition, one state follows the other state in an order based on the transition orientation. However, a state relationship between two states may exist where one of those two states does not necessarily follow the other of the two states, but the two states are required to be visited in a particular order. For example, state s and state s' have a temporal relationship if state s' can be visited only after state s was visited at least once and state s' can be visited again only if state s was visited at least once after the last visit of s'. Note that on any correct execution path traversing one or more times through s', there is a non-empty subpath preceding the state s' such that the subpath goes via state s but not via state s'.

Figure 6:
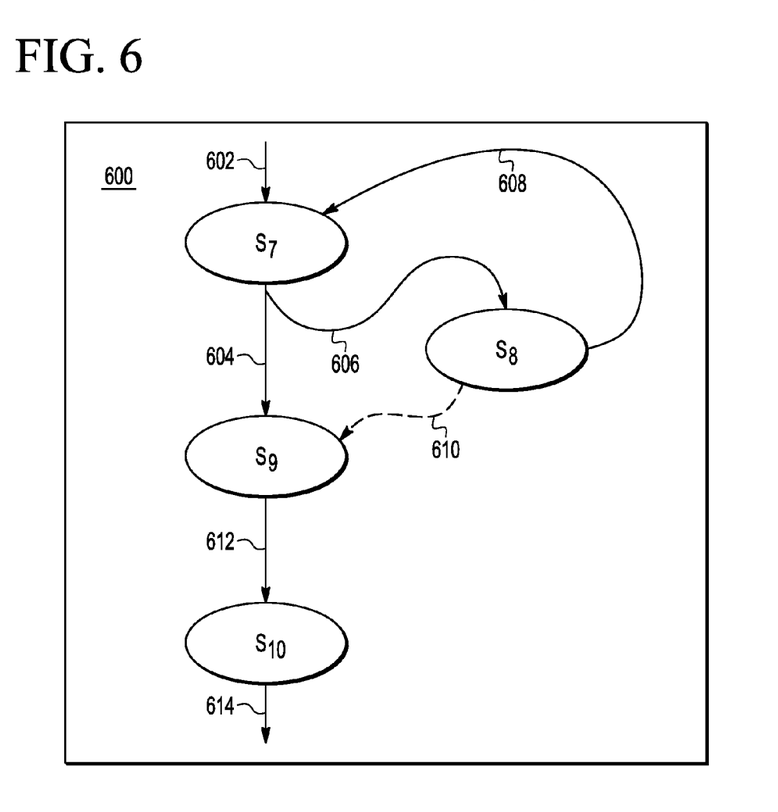
FIG. 6 illustrates a state diagram for an exemplary portion of a state machine having a temporal relationship between states consistent with at least one embodiment of the invention.

FIG. 6 illustrates portion 600 of a state machine including temporal relationships between state $s_8$ and state $s_9$ of the state machine. Both state $s_8$ and state $s_9$ may follow state $s_7$. Although direct transition from state $s_8$ to state $s_9$ does not exist in portion 600, temporal relationship 610 requires the state machine to visit state $s_9$ via transition 604 only after visiting state $s_8$ at least once. In addition, once state $s_9$ has been visited, it may be visited again only if state $s_8$ is visited again after that visit to state $s_9$. Thus, the predetermined temporal relationship may be satisfied for initial execution and subsequent execution. A temporal relationship may exist between states from two distinct parallel state machines.

Figure 8:
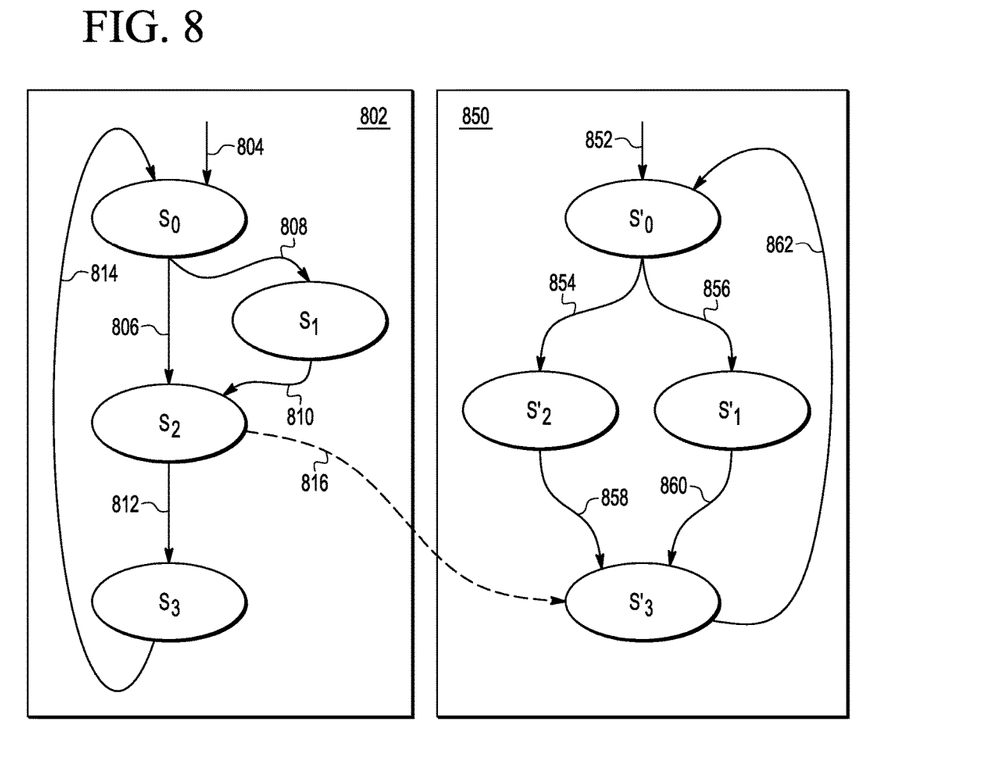
FIG. 8 illustrates a state diagram for an exemplary temporal relationship between states of distinct state machines executing in parallel consistent with at least one embodiment of the invention.

Such relationship defines a logical order in which the states may be visited that should be followed by system design. Yet, in the presence of faults, such relationship may be violated and therefore it may be useful to observe that the relationship is satisfied in operation. FIG. 8 illustrates portion 802 of a first state machine having a temporal relationship 816 with portion 850 of a second state machine. Although direct transition from state $s_2$ to state $s'_3$ does not exist between portions 802 and 850, temporal relationship 816 requires the first state machine to visit state $s'_3$ via transition 858 or transition 860 only after the second state machine visits state $s_2$ at least once. In addition, once state $s'_3$ has been visited, it may be visited again only if state $s_2$ was visited again after that visit to state $s'_3$. Monitoring such predetermined temporal relationships across state machines facilitates monitoring execution dependencies across different tasks, threads, or protocols.

Figure 7:
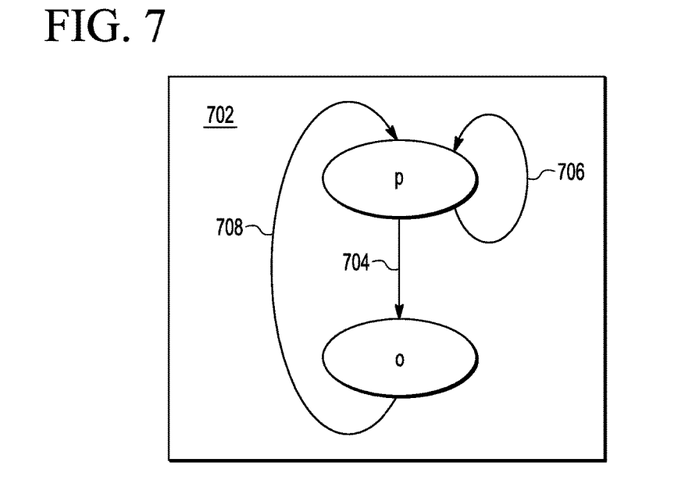
FIG. 7 illustrates a state diagram for an exemplary temporal relationship state machine consistent with at least one embodiment of the invention.

A temporal relationship state machine or temporal relationship state machine may be configured to observe execution compliance with a predetermined temporal relationship. The temporal relationship state machine executes similarly to a state machine, as described above, but has no notion of a clock, is not timed, and has no timing constraints. Referring to FIG. 7, temporal relationship state machine 702 includes a first state p and a second state o. A set of transitions includes three transitions: transition 708 from state o to state p, transition 704 from state p to state o, and transition 706 from state p to state p. The initial state of temporal relationship state machine 702 is state o, i.e., the current state of temporal relationship state machine 702 is initialized to state o. Similarly to other state machines, the end state of a transition is the state to which the temporal relationship state machine transitions. However, unlike other state machines, a temporal relationship state machine has no variable TReq. Instead, each progress request to state o or state p is assumed to be performed instantly. The purpose of temporal relationship state machine 702 is to observe that the state machine state associated with state o is visited only after the state machine visits a state associated with state p. That is, a visit by the state machine to the state associated with state p shall precede a visit by the state machine to the state associated with state o.

For example, referring to FIGS. 6 and 7, state $s_8$ of state machine 600 is associated with state p and state $s_9$ of state machine 600 is associated with state o. If state machine 600 progresses to state $s_8$ or state $s_9$, state machine 600 initiates a progress request for the temporal relationship state machine 702 to state p or state o, respectively. Referring to FIGS. 7 and 8, state $s_2$ of state machine 802 is associated with state p and state $s'_3$ of state machine 850 is associated with state o. If state machine 802 progresses to state $s_2$, state machine 802 initiates a progress request for the temporal relationship state machine 702 to state p. If state machine 850 progresses to state $s'_3$, state machine 850 initiates a progress request for the temporal relationship state machine 702 to state o.

Referring to FIG. 7, in at least one embodiment, in response to a progress request to state o a temporal relationship state machine 702 shall return an acknowledgement indicating whether or not the progress was successful and satisfied the predetermined temporal relationship. State o is the observed state, whereas state p is the state that precedes state o. State o may be entered only if the current state of temporal relationship state machine 702 is state p. In contrast, temporal relationship state machine 702 may enter state p at any time. Therefore, progress requests to state p are always legal and need not return an acknowledgement. State o is the state that is the target of monitoring from the temporal perspective: state o is visited only after visiting state p. If both state o and state p are associated with states from the same state machine, there can never be legal requests to enter each of the two states within a single tick period Δτ. If requests to enter each of the two states within a single tick period Δτ are received, an early transition violation occurs. However, if the predetermined temporal relationship is between states of two different state machines, temporal relationship state machine 702 can receive two progress requests within a single tick period Δτ. The two temporal relationship state machine requests within the same tick period Δτ are considered to have arrived at the same time. Under those circumstances, progress to state o precedes progress to state p. That is, temporal relationship state machine 702 progresses to state o before progressing to state p. However, the progress request to state o may be illegal if temporal relationship state machine 702 is currently in state o.

In at least one embodiment of state machine observer 126, temporal relationship state machine 702 detects an illegal transition violation when progress to state o is requested while temporal relationship state machine 702 is currently in state o. An illegal transition violation may be the only violation that occurs in a temporal relationship state machine. In at least one embodiment of temporal relationship state machine 702, progress to state p is always legal. Since the purpose of temporal relationship state machine 702 is to observe that a state machine enters the state associated with state o after a state machine enters the state associated with state p, temporal relationship state machine 702 may only generate a status indicator for the state machine containing the state associated with state o indicating whether or not transition to the state associated with state o is allowed.

For example, referring to FIGS. 7 and 8, temporal relationship state machine 702 may receive two different types of temporal relationship progress requests from state machine 802 and from state machine 850: a progress request to state o and a progress request to state p. Temporal relationship state machine 702 executes the progress request to state o. Temporal relationship state machine 702 returns a status indicator of OK if the progress is successful and state machine 850 will progress to the state associated with state o. Temporal relationship state machine 702 returns illegal transition if the progress to state o cannot be performed. If temporal relationship state machine 702 returns illegal transition, state machine 850 will not progress to the state associated with state o and enters illegal transition state. If the current state is state p, in response to a progress request to state p, temporal relationship state machine 702 maintains the current state p. If the current state is state o, in response to a progress request to state p, temporal relationship state machine 702 progresses to state p. If the current state is state o, in response to a progress request to state o, temporal relationship state machine 702 will not progress to the state associated with state o and returns illegal transition, state machine 850 will not progress to the state associated with state o and enters illegal transition state.

In at least one embodiment of temporal relationship state machine 702, although progress to state p is always legal, progress requests to state p may be buffered in a storage element in microprocessor backbone 102 of FIGS. 1-3 to assure that progresses to state o are executed first. State machine requests for progress of temporal relationship state machine 702 to state p may be recorded using an index identifying a corresponding temporal relationship state machine in a p-request buffer with no return value. A p-request buffer stores the indices of the temporal relationship state machine for which the progress request to state p was initialized. Execution of a progress request to state p does not return an acknowledgement. The temporal relationship state machine processes the p-request buffer after all state machines are progressed. Since temporal relationship state machines are independent, the order in which state machine observer 126 processes the stored progress requests is irrelevant.

In at least one embodiment, a method includes receiving a first progress request from a first state machine associated with execution of a first thread on a processor. The method includes updating a current state of a temporal relationship state machine based on the current state, the first progress request, and a predetermined temporal relationship between progress of the first state machine to a first state machine state and progress to a second state. The predetermined temporal relationship may require the first state machine to progress to the first state machine state before the progress to the second state. The current state of the temporal relationship state machine may be one of a first temporal relationship state and a second temporal relationship state. The method may further include initializing the current state of the temporal relationship state machine to be the second temporal relationship state prior to receiving the first progress request. The updating may include updating the current state of the temporal relationship state machine according to the first progress request in response to compliance with the predetermined temporal relationship. The updating may include maintaining the current state of the temporal relationship state machine in response to noncompliance with the predetermined temporal relationship. The method may include generating a status indicator based on the current state, the first progress request, and the predetermined temporal relationship. The method may include updating a state of the first state machine in response to the status indicator. The second state may be a second state machine state of a second state machine. The method may further include generating a second progress request by the second state machine based on execution of a second thread on the processor. The updating may be further based on the second progress request. The predetermined temporal relationship may require the temporal relationship state machine to process the first progress request and the second progress request in an order that processes a request to progress to the first temporal relationship state before progressing to the second temporal relationship state. The second state may be a second state machine state of the first state machine.

In at least one embodiment, an apparatus includes a first state machine configured to generate a first progress request based on execution of a first thread on a processor. The apparatus includes a temporal relationship state machine configured to update a current state of the temporal relationship state machine based on the current state, the first progress request, and a predetermined temporal relationship between progress of the first state machine to a first state machine state and progress to a second state. The predetermined temporal relationship may require the first state machine to progress to the first state machine state before the progress to the second state. The current state of the temporal relationship state machine may be one of a first temporal relationship state and a second temporal relationship state. The current state of the temporal relationship state machine may be initialized to be the second temporal relationship state. The temporal relationship state machine may be configured to update the current state according to the first progress request in response to compliance with the predetermined temporal relationship. The temporal relationship state machine may be configured to maintain the current state of the temporal relationship state machine in response to noncompliance with the predetermined temporal relationship. The temporal relationship state machine may be further configured to generate a status indicator based on the current state, the first progress request, and the predetermined temporal relationship.

The first state machine may be configured to update a state of the first state machine in response to the status indicator. The apparatus may include a second state machine including the second state. The second state machine may be configured to generate a second progress request based on execution of a second thread on the processor. The current state may be updated further based on the second progress request. The predetermined temporal relationship may require the temporal relationship state machine to process the first progress request and the second progress request in an order that processes a request to progress to the first temporal relationship state before a request to progress to the second temporal relationship state. The second state may be a second state machine state of the first state machine.

The apparatus may include a state machine observer including the first state machine and the temporal relationship state machine. The state machine observer may be configured to provide a status indicator to the first thread. The status indicator being based on the current state of the temporal relationship state machine. The processor may include a plurality of processor cores. One of the plurality of processor cores may include the state machine observer responsive to status information received from at least one other of the plurality of processor cores and the first state machine generates the first progress request based on the status information. The state machine observer may be configured to enter an error state in response to detecting an illegal transition of the temporal relationship state machine.

In at least one embodiment, a computer program product is encoded in one or more tangible machine-readable media. The computer program product includes a first sequence of instructions executable to generate a first state machine progress request based on execution of a first thread. The computer program product includes a second sequence of instructions executable to update a state of a temporal relationship state machine from a current state to a next state in response to the current state and compliance of the first state machine progress request with a predetermined temporal relationship between progress of the first state machine to a first state machine state and progress to a second state. The predetermined temporal relationship may require the first state machine to progress to the first state machine state before the progress to the second state. The current state of the temporal relationship state machine may be one of a first temporal relationship state and a second temporal relationship state. The computer program product may further include a third sequence of instructions to initialize the current state of the temporal relationship state machine to be the second temporal relationship state prior to receiving the first progress request. The second sequence of instructions may be executable to update the current state of the temporal relationship state machine according to the first progress request in response to compliance with the predetermined temporal relationship, and to maintain the current state of the temporal relationship state machine in response to noncompliance with the predetermined temporal relationship. The second sequence of instructions may be executable to generate a status indicator based on the current state, the first progress request, and the predetermined temporal relationship.

Structures described herein may be implemented using software executing on a processor (which includes firmware) or by a combination of software and hardware. Software, as described herein, may be encoded in at least one tangible (i.e., non-transitory) computer readable medium. As referred to herein, a tangible computer-readable medium includes at least a disk, tape, or other magnetic, optical, or electronic storage medium.

While circuits and physical structures have been generally presumed in describing embodiments, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that may be related to hardware, software, firmware or combinations thereof.

Thus various embodiments of a state machine observer that monitors temporal dependencies have been described. Although the invention is described herein with reference to specific embodiments, various modifications and changes can be made without departing from the scope of the present invention as set forth in the claims below. For example, while the invention has been described in embodiments in which the predetermined temporal relationship requires a first state to be visited before a second state, one of skill in the art will appreciate that the teachings herein can be utilized with other predetermined temporal relationships. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for monitoring operation flow of tasks executing on a processing system comprising:
   receiving a first progress request from a first state machine monitoring execution of a first thread on a processor; and
   updating a current state of a temporal relationship state machine based on the current state, the first progress request, and a predetermined temporal relationship between progress of the first state machine to a first state machine state and progress to a second state machine state, the temporal relationship state machine monitoring progress of the first state machine, wherein the predetermined temporal relationship requires the first state machine to progress to the first state machine state from a third state machine state before the first state machine progresses to the second state machine state from the third state machine state, and wherein the third state machine state is different from the second state machine state.

2. The method, as recited in claim 1, wherein the current state of the temporal relationship state machine is one of a first temporal relationship state and a second temporal relationship state and the method further comprises:
  initializing the current state of the temporal relationship state machine to be the second temporal relationship state prior to receiving the first progress request, wherein the updating comprises:
    updating the current state of the temporal relationship state machine in response to compliance with the predetermined temporal relationship of the first progress request; and
    maintaining the current state of the temporal relationship state machine in response to noncompliance with the predetermined temporal relationship of the first progress request.

3. The method, as recited in claim 1, further comprising:
  generating a status indicator indicating whether the first progress request is legal based on the current state, the first progress request, and the predetermined temporal relationship; and
  updating a state of the first state machine in response to the status indicator.

4. A method for monitoring operation flow of tasks executing on a processing system comprising:
  receiving a first progress request from a first state machine monitoring execution of a first thread on a processor;
  updating a current state of a temporal relationship state machine based on the current state, the first progress request, and a predetermined temporal relationship between progress of the first state machine to a first state machine state and progress of a second state machine to a second state machine state, the temporal relationship state machine monitoring progress of the first state machine, and the predetermined temporal relationship requires the first state machine to progress to the first state machine state before the second state machine progresses to the second state machine state; and
  generating a second progress request by the second state machine based on execution of a second thread on the processor, the updating being further based on the second progress request.

5. The method, as recited in claim 4, wherein the predetermined temporal relationship requires the temporal relationship state machine to process the first progress request and the second progress request in an order that processes a request to progress to the first temporal relationship state before progressing to the second temporal relationship state.

6. The method, as recited in claim 4, wherein the current state of the temporal relationship state machine is one of a first temporal relationship state and a second temporal relationship state and the method further comprises:
  initializing the current state of the temporal relationship state machine to be the second temporal relationship state prior to receiving the first progress request, wherein the updating comprises:
    updating the current state of the temporal relationship state machine in response to compliance with the predetermined temporal relationship of the first progress request; and
    maintaining the current state of the temporal relationship state machine in response to noncompliance with the predetermined temporal relationship of the first progress request.

7. The method, as recited in claim 4, further comprising:
  generating a status indicator indicating whether the first progress request is legal based on the current state, the first progress request, and the predetermined temporal relationship; and
  updating a state of the first state machine in response to the status indicator.

8. An apparatus for monitoring operation flow of tasks executing on a processing system comprising:
  a first state machine configured to monitor execution of a first thread on a processor and further configured to generate a first progress request based on the execution of the first thread on the processor; and
  a temporal relationship state machine configured to monitor progress of the first state machine and further configured to update a current state of the temporal relationship state machine based on the current state, the first progress request, and a predetermined temporal relationship between progress of the first state machine to a first state machine state and progress to a second state machine state,
  wherein the predetermined temporal relationship requires the first state machine to progress to the first state machine state before a second state machine progresses to the second state machine state.

9. The apparatus, as recited in claim 8,
  wherein the current state of the temporal relationship state machine is one of a first temporal relationship state and a second temporal relationship state,
  wherein the current state of the temporal relationship state machine is initialized to be the second temporal relationship state, and
  wherein the temporal relationship state machine is configured to update the current state in response to compliance with the predetermined temporal relationship of the first progress request, and
  wherein the temporal relationship state machine is configured to maintain the current state of the temporal relationship state machine in response to noncompliance with the predetermined temporal relationship of the first progress request.

10. The apparatus, as recited in claim 9,
  wherein the temporal relationship state machine is further configured to generate a status indicator based on the current state, the first progress request, and the predetermined temporal relationship; and
  wherein the first state machine is configured to update a state of the first state machine in response to the status indicator.

11. The apparatus, as recited in claim 8, further comprising:
  a second state machine including the second state machine state, the second state machine being configured to generate a second progress request based on execution of a second thread on the processor, the current state being updated further based on the second progress request.

12. The apparatus, as recited in claim 11, wherein the predetermined temporal relationship requires the temporal relationship state machine to process the first progress request and the second progress request in an order that processes a request to progress to the first temporal relationship state before a request to progress to the second temporal relationship state.

13. The apparatus, as recited in claim 8, further comprising:
a state machine observer comprising:
the first state machine; and
the temporal relationship state machine,
wherein the state machine observer is configured to provide a status indicator to the first thread, the status indicator being based on the current state of the temporal relationship state machine.

14. The apparatus, as recited in claim 13, wherein the processor comprises:
a plurality of processor cores, wherein one of the plurality of processor cores comprises the state machine observer responsive to status information received from at least one other of the plurality of processor cores and the first state machine generates the first progress request based on the status information.

15. The apparatus, as recited in claim 13, wherein the state machine observer is configured to enter an error state in response to detecting an illegal transition by the temporal relationship state machine.

16. The apparatus, as recited in claim 8, wherein the apparatus comprises:
a computer program product encoded in one or more tangible, non-transitory, machine-readable media, the computer program product comprising:
a first sequence of instructions executable as the first state machine; and
a second sequence of instructions executable as the temporal relationship state machine.

17. The apparatus, as recited in claim 16,
wherein the current state of the temporal relationship state machine is one of a first temporal relationship state and a second temporal relationship state, and the computer program product further comprises:
a third sequence of instructions to initialize the current state of the temporal relationship state machine to be the second temporal relationship state prior to receiving the first progress request.

18. The apparatus, as recited in claim 16, wherein the second sequence of instructions is executable to:
update the current state of the temporal relationship state machine in response to compliance with the predetermined temporal relationship of the first progress request; and
maintain the current state of the temporal relationship state machine in response to noncompliance with the predetermined temporal relationship of the first progress request; and
generate a status indicator based on the current state, the first progress request, and the predetermined temporal relationship.

* * * * *